United States Patent Office 3,847,834
Patented Nov. 12, 1974

3,847,834
STABILIZED COMPLEXES OF ALKALI METAL AND ORGANIC COMPOUND AND METHOD FOR THEIR PREPARATION
Kent S. Dennis, Midland, Mich., assignor to The Dow Chemical Company, Midland, Mich.
No Drawing. Filed Oct. 24, 1973, Ser. No. 409,339
Int. Cl. C07f 1/04
U.S. Cl. 252—43 R       12 Claims

ABSTRACT OF THE DISCLOSURE

A complex of an alkali metal such as sodium and an organic compound such as α-methylstyrene is prepared by contacting the alkali metal and the organic compound at a temperature of between about 0° and about 50° C. in a solvent system which includes a major amount of a hydrocarbon such as benzene and a minor amount of ethylene glycol dimethyl ether. The ethylene glycol dimethyl ether functions in the solution as a stabilizer for the complex. The complexes have utility as polymerization initiators in the anionic polymerization of conjugated diolefins such as 1,3-butadiene.

This invention relates to polymerization initiators. In one aspect, this invention relates to techniques for improving the stability of polymerization initiators and for reducing the loss in the activity of the initiator. In another aspect, this invention relates to improved solvent systems for polymerization initiators.

The patent art and technical literature is replete with techniques for producing complexes or so-called addition compounds of alkali metals and hydrocarbons. Many of these complexes are useful as polymerization initiators in the polymerization of conjugated diolefins such as 1,3-butadiene. U.S. Pat. 2,985,594 describes a technique for preparing a complex of an alkali metal such as sodium and α-methylstyrene. According to the teachings in that patent, the alkali metal and the α-methylstyrene are contacted in an anhydrous ether reaction medium such as tetrahydrofuran at concentrations and under conditions to prevent the formation of a high molecular weight polymer of α-methylstyrene. The resulting addition compound is an alkali metal-terminated complex wherein the α-methylstyrene is present as trimer to hexamer with the predominant complex being α-methylstyrene tetramer. Further details of the technique of preparing these complexes can be had by reference to the above patent, the disclosure of which is specifically incorporated herein by reference.

U.S. Pat. 3,346,666 discloses a technique for preparing carboxylic acid terminated block copolymers of α-methylstyrene and a conjugated diolefin. The polymerization initiator is a complex of an alkali metal and α-methylstyrene. Further details of this process can be had by reference to this patent, the disclosure of which is likewise specifically incorporated herein by reference.

In view of the comparatively high costs of ether solvents such as tetrahydrofuran, from an economic standpoint it is evident that it would be desirable to prepare the complexes of the alkali metal and the hydrocarbon in a less expensive reaction medium. Unfortunately, these complexes are very unstable in solvent systems which contain even small amounts of a hydrocarbon type solvent such as benzene. That is, when the complexes are prepared in a solvent system containing a hydrocarbon solvent they lose their activity as polymerization initiators in a relatively short period of time. The loss in activity is aggravated by increasing the concentration of the hydrocarbon solvent in the solvent system. The stability and hence the activity of the complex is further decreased as the initial normality of the complex in the solvent system is increased.

According to this invention, addition compounds in the form of complexes of an organic compound and an alkali metal can be prepared in a hydrocarbon solvent such as benzene and the stability of the complexes and their activity as polymerization initiators greatly improved when the hydrocarbon solvent contains a minor amount of ethylene glycol dimethyl ether. This was a surprising discovery because closely related ethers such as diethylene glycol dimethyl ether and tetraethylene glycol dimethyl ether do not produce this stabilizing effect.

Accordingly, it is an object of this invention to provide an addition compound in the from of a complex of an alkali metal and an organic compound which is suitable as a polymerization initiator.

Another object of this invention is to improve the stability and hence the polymerization activity of a complex of an organic compound and an alkali metal.

A further object of this invention is to reduce the cost in preparing complexes of an organic compound and an alkali metal.

These and other objects of the invention will become apparent to one skilled in the art after studying the following detailed description and the appended claims.

In the practice of the invention, a complex of an organic compound of the formula

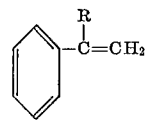

wherein R is phenyl or an alkyl having up to 4 carbon atoms and an alkali metal selected from the group consisting of sodium, potassium, rubidium, and cesium, is prepared by contacting the organic compound and the alkali metal in a proportion of between about 0.5 and about 2 gram atomic weights of alkali metal per gram molecular proportion of organic compound at a temperature of between about 0° and about 50° C. in a solvent system comprising a major amount of and preferably between about 50 and about 98 volume percent hydrocarbon and a minor amount of and preferably between about 2 and about 50 volume percent ethylene glycol dimethyl ether. The ethylene glycol dimethyl ether is preferably employed in an amount equal to at least one mol per mole of alkali metal. If desired, the solvent system can also include up to 48 volume percent of a cyclic ether selected from the group consisting of tetrahydrofuran and 1,4-dioxane.

Exemplary organic compounds within the scope of the above formula which can be used to form the complex include α-methylstyrene, α-ethylstyrene, α-butylstyrene, 1,1-diphenylethylene, and the like. The organic compound is employed in admixture with the solvent system in a concentration of between about 0.05 and about 2 gram moles per liter of the solution. The method is preferably conducted at atmospheric pressure although pressures slightly above atmospheric can be employed if desired. When the reaction is practiced at the concentrations and under the conditions outlined above and the organic compound is α-methylstyrene, the resulting product is an addition compound in the form of a dialkali metal complex of the α-methylstyrene trimers to hexamers wherein the principal product of the reaction is the α-methylstyrene tetramer. When the organic compound is 1,1-diphenylethylene, the resulting product is an addition compound in the form of a dialkali metal complex of the 1,1-diphenylethylene dimer.

As previously indicated, when the normality of the complex in the solution is increased its stability and activity as an initiator decreases more rapidly with time. Normality as used herein means the equivalent of alkali metal combined with the organic compound complexing agent in one liter of solution. Thus, since the problem of stability is more prevalent at higher normalities, the affect of the ethylene glycol dimethyl ether is more pronounced at the higher normalities. In general, the advantages of the invention are realized at normalities of at least about 0.1.

In practicing the method of the invention the reagents and the solvent system should be free of impurities which would react with the alkali metal complex or which would interfere with its formation. In general, the reaction should be conducted in the absence of anything which will react with a Grignard reagent such as air, water, oxygen, ammonia, and the like which would react with and kill the alkali metal complex or inhibit its formation. The reaction should thus be conducted in an inert atmosphere such as nitrogen or helium.

The hydrocarbon in the solvent system of the invention has between 6 and 12 carbon atoms per molecule and is free of aliphatic unsaturation. Exemplary hydrocarbon solvents which can be used include benzene, alkylbenzene, cyclohexane, alkylcyclohexane, and saturated aliphatic compounds. Alkylbenzenes which can be used include ethylbenzene and the like. Alkyl substituted cyclohexanes which can be used include methylcyclohexane and the like. Exemplary aliphatic hydrocarbons include hexane, nonane, decane, dodecane, and the like. One of the requirements of the hydrocarbon solvent of the reaction medium is that it be inert so as to not interfere with the reaction.

As previously indicated, the alkali metal complexes of the invention have utility as polymerization initiators in the anionic polymerization of conjugated diolefins such as 1,3-butadiene. The alkali metal complexes can also be used to initiate the polymerization of styrene, alkyl styrene, methacrylates, and the like.

The following examples illustrate methods whereby the alkali metal complexes can be prepared and the effect which the ethylene glycol dimethyl ether has on the stability of the resulting complex. Such examples are for the purpose of illustration only and should not be construed as limiting of the invention.

EXAMPLE 1

A one-liter, three neck, fluted flask was used to prepare several polymerization initiators in various solvent systems. One neck of the flask was provided with a nitrogen inlet and bubbler, another neck was used to accommodate a stirrer, and the other neck was used for adding reagents and for withdrawing samples. In a typical run for preparing an initiator, the flask was first thoroughly, purged with nitrogen and subsequently charged with α-methylstyrene complexing agent and the particular solvent by means of a syringe. All of the reagents had been previously dried. The contents in the flask were maintained under nitrogen during the run. The flask including the contents was then cooled in an ice bath and a predetermined amount of alkali metal dispersion added slowly by syringe with stirring. The alkali metal reacted immediately turning the solution to a blood-red color and warming it to about room temperature. The ice bath was then removed and stirring continued. Samples of the solution containing the resulting alkali metal addition complex were withdrawn periodically and titrated to determine their normality and hence their activity as polymerization initiators in the particular solvent with the passage of time. In determining the normality or activity of the initiators, about 10 ml. of the solution was withdrawn with a syringe, weighed, and added to 20 ml. of dry n-butyl bromide. The n-butyl bromide reacts with the alkali metal of the addition complex to produce alkali metal bromide. This solution was then titrated by the Mohr method for free bromide ion. The activity of the initiator is expressed as meq. of alkali metal per 10 grams of solution. The normality of the solution containing the alkali metal addition complex means the equivalent of alkali metal combined with the complexing agent in one liter of solution.

A 500-ml. 1 Normal solution of sodium α-methyl styrene complex was prepared by charging the flask with 130 ml. of α-methylstyrene complexing agent along with 370 ml. of solvent. In this and the following examples, the concentrations of the solvent system are based upon solvent alone and do not include the complexing agent. In this particular run, the solvent system was 80 percent benzene or 296 ml., 10 percent tetrahydrofuran or 37 ml., and 10 percent dimethoxyethane or 37 ml. One-half of a mole of sodium is required to make the 500 ml. 1 Normal solution. Thus, 23 grams of a dispersion containing 50 percent by weight sodium in Stoddard solvent was added slowly to the flask with a syringe. A few tenths of a gram extra were added to allow for impurities in the reagents. The normality and hence polymerization activity of the several initiators was then determined by the titration procedure outlined above. Table I below shows the activity of the initiator at the indicated time after preparation for a particular solvent system with a particular initial normality. The activity of the initiators at zero time was determined by plotting the activity at various elapsed times after preparation and extrapolating the resulting curves to zero time. This technique was used in this and the following examples. Table I also shows the activity of the initiator remaining at various elapsed times as a percent of the activity of the initiator at zero time. In Table I, THF means tetrahydrofuran and EGDME means ethylene glycol dimethyl ether.

TABLE I

| Run No. | Solvent | Nominal normality | Time (hrs.) | Activity (meq./10 g.) | Activity remaining (percent) |
|---|---|---|---|---|---|
| C1 | THF | 1 N | 0.00 | 11.00 | 100 |
|  |  |  | 0.68 | 10.96 | 99.6 |
|  |  |  | 1.42 | 11.15 | 101.4 |
|  |  |  | 18.38 | 10.80 | 98.2 |
|  |  |  | 24.67 | 10.90 | 99.1 |
|  |  |  | 42.80 | 10.32 | 93.8 |
|  |  |  | 50.13 | 10.45 | 95.0 |
|  |  |  | 66.17 | 9.78 | 88.9 |
| C2 | 67 benzene, 33 THF | 0.1 N | 0.00 | 0.940 | 100 |
|  |  |  | 0.52 | 0.939 | 99.9 |
|  |  |  | 0.95 | 0.948 | 100.8 |
|  |  |  | 2.30 | 0.944 | 100.4 |
|  |  |  | 6.36 | 0.935 | 99.5 |
|  |  |  | 22.40 | 0.973 | 103.5 |
|  |  |  | 22.85 | 0.911 | 96.9 |
| C3 | 67 benzene, 33 THF | 0.25 N | 0.00 | 2.65 | 100 |
|  |  |  | 1.07 | 2.76 | 104.2 |
|  |  |  | 2.45 | 2.58 | 97.4 |
|  |  |  | 18.15 | 2.51 | 94.7 |
|  |  |  | 26.71 | 2.42 | 91.3 |
|  |  |  | 42.62 | 2.08 | 78.5 |
|  |  |  | 50.73 | 2.08 | 78.5 |
|  |  |  | 66.45 | 2.01 | 75.8 |
| C4 | 67 benzene, 33 THF | 0.5 N | 0.00 | 5.50 | 100 |
|  |  |  | 0.48 | 5.49 | 99.8 |
|  |  |  | 1.05 | 5.55 | 100.9 |
|  |  |  | 3.50 | 5.43 | 98.7 |
|  |  |  | 5.67 | 5.36 | 97.4 |
|  |  |  | 22.88 | 4.68 | 85.1 |
|  |  |  | 29.47 | 4.54 | 82.5 |
| C5 | 67 benzene, 33 THF | 0.75 N | 0.00 | 8.00 | 100 |
|  |  |  | 0.55 | 7.88 | 98.5 |
|  |  |  | 1.40 | 7.83 | 97.9 |
|  |  |  | 3.87 | 7.72 | 96.5 |
|  |  |  | 5.28 | 7.71 | 96.4 |
|  |  |  | 20.94 | 6.55 | 81.9 |
|  |  |  | 28.38 | 5.98 | 74.8 |
| C6 | 67 benzene, 33 THF | 1 N | 0.00 | 10.80 | 100 |
|  |  |  | 0.47 | 9.80 | 90.7 |
|  |  |  | 1.10 | 10.10 | 93.5 |
|  |  |  | 2.45 | 9.94 | 92.0 |
|  |  |  | 4.00 | 9.75 | 90.3 |
|  |  |  | 5.13 | 9.60 | 88.9 |
|  |  |  | 6.25 | 9.48 | 87.8 |
|  |  |  | 45.95 | 3.02 | 28.0 |
| 1 | 67 benzene, 30 THF, 3 EGDME. | 1 N | 0.00 | 9.50 | 100 |
|  |  |  | 1.80 | 9.56 | 100.6 |
|  |  |  | 5.83 | 9.08 | 95.6 |
|  |  |  | 22.00 | 8.65 | 91.1 |
|  |  |  | 29.90 | 8.69 | 91.5 |
|  |  |  | 45.93 | 8.20 | 86.3 |

As indicated by the data reported in Control Run C1 in Table I, tetrahydrofuran provides an excellent medium for the sodium α-methylstyrene initiator in that the initiator remains stable and hence its activity for polymerization remains high for as long as 66 hours after preparation. Control Runs C2 through C6 illustrate two phenomenons. First, these data show that as normality increases the stability or activity of the initiator decreases in the presence of the hydrocarbon. Second, when a portion of the activity of the catalyst decreases rapidly with time (compare Control Runs C1 and C6). As illustrated by the data reported in Run No. 1, the inclusion in the solvent system of three volume percent of ethylene glycol dimethyl ether greatly improves the stability of the sodium α-methylstyrene initiator (Control Run C6 and Run No. 1).

EXAMPLES 2 THROUGH 4

In another series of runs, several other sodium α-methylstyrene polymerization initiators were prepared in various solvent systems by the apparatus and technique described in Example 1. In all of the runs, a 0.75 Normal solution of 500 ml. was prepared by adding 16.95 grams of a dispersion containing 50 weight percent sodium in Stoddard solvent. The solvent systems and their relative concentrations in each of the runs are reported in Table II below. The symbols THF and EGDME mean, respectively, tetrahydrofuran and ethylene glycol dimethyl ether. The concentrations of the materials which make up the solvent system are based upon solvent alone and do not include the other materials in the flask. Thus, as an illustration, in Run No. 2 reported in Table II, the 500 ml. solution consisted of 97.5 ml. α-methylstyrene and 402.5 ml. of solvent. The solvent in this run consisted of 80 percent or 322 ml. benzene, 17.25 percent or 69.5 ml. tetrahydrofuran, and 2.75 percent or 11 ml. of ethylene glycol dimethyl ether. The activities of the initiators at various periods of time after preparation were obtained as described in Example 1 and are also reported in Table II.

TABLE II

| Run No. | Solvent | Time (hrs.) | Activity (meq./10 g.) | Activity remaining (percent) |
|---|---|---|---|---|
| C7 | 80 benzene, 20 THF | 0.00 | 7.40 | 100 |
| | | 0.58 | 7.49 | 101.2 |
| | | 1.08 | 6.74 | 91.1 |
| | | 2.00 | 6.94 | 93.9 |
| | | 3.50 | 7.62 | 103.0 |
| | | 6.00 | 6.53 | 88.2 |
| | | 23.18 | 2.42 | 32.7 |
| | | 23.62 | 2.49 | 33.6 |
| 2 | 80 benzene, 17.25 THF, 2.75 EGDME. | 0.00 | 6.60 | 100 |
| | | 0.72 | 6.90 | 104.5 |
| | | 1.43 | 6.66 | 100.9 |
| | | 2.80 | 6.37 | 96.5 |
| | | 18.92 | 5.29 | 80.2 |
| | | 26.00 | 5.04 | 76.4 |
| | | 42.78 | 4.54 | 68.8 |
| 3 | 90 benzene, 10 EGDME | 0.00 | 6.60 | 100 |
| | | 0.58 | 6.26 | 94.8 |
| | | 1.72 | 6.51 | 98.6 |
| | | 6.50 | 6.58 | 99.7 |
| | | 23.45 | 5.51 | 83.5 |
| | | 30.43 | 4.83 | 73.2 |
| | | 48.00 | 4.03 | 61.1 |
| 4 | 90 benzene, 3.5 THF, 6.5 EGDME. | 0.00 | 5.90 | 100 |
| | | 0.87 | 5.72 | 96.9 |
| | | 2.57 | 5.72 | 96.9 |
| | | 18.27 | 4.24 | 71.9 |
| | | 26.50 | 4.04 | 68.5 |
| | | 43.33 | 3.26 | 55.3 |

As shown by the data in Control Run C7 in Table II, when the solvent system contains 80 percent benzene the activity of the polymerization initiator decreases substantially in less than 24 hours after preparation. When this result is compared to the result obtained in Run No. 2 wherein the solvent system contains 80 percent benzene and 2.75 parts of the tetrahydrofuran is replaced with ethylene glycol dimethyl ether, it can be seen that the activity is not only much better after 24 hours but it also remains relatively high after almost 43 hours. In Run Nos. 3 and 4, wherein the solvent system contains 90 percent benzene, it can be seen that even with this much hydrocarbon in the solvent system the activity of the initiator remains relatively high.

EXAMPLES 5 AND 6

The apparatus and technique described in Example 1 were employed to prepare 0.5 Normal solutions of sodium α-methylstyrene polymerization initiators. This was accomplished by adding 13.91 grams of a dispersion containing 50 weight percent sodium in Stoddard solvent in Example 5 and 12.40 grams of the dispersion in Example 6. The sodium added in excess of the theoretical amount necessary to produce a 0.5 Normal solution was to allow for impurities. The solutions were titrated for normality by the technique described in Example 1. The activities of the initiators at various time intervals after preparation were obtained as in Example 1 and are reported in Table III below. As used in Table III, EGDME means ethylene glycol dimethyl ether.

TABLE III

| Run No. | Solvent | Time (hrs.) | Activity (meq./10 g.) | Activity remaining (percent) |
|---|---|---|---|---|
| 5 | 90 benzene, 10 EGDME | 0.00 | 5.4 | 100 |
| | | 0.55 | 5.72 | 105.9 |
| | | 1.75 | 5.11 | 94.6 |
| | | 21.82 | 5.03 | 93.1 |
| | | 42.08 | 5.04 | 93.3 |
| 6 | 94 benzene, 6 EGDME | 0.00 | 4.50 | 100 |
| | | 0.48 | 4.69 | 104.2 |
| | | 17.12 | 4.28 | 95.1 |
| | | 21.08 | 4.57 | 101.6 |
| | | 25.10 | 4.15 | 92.2 |
| | | 41.12 | 4.18 | 92.9 |

As illustrated by the data reported in Table III, the ethylene glycol dimethyl ether greatly improves the stability and hence the activity of the sodium α-methylstyrene polymerization initiator. In Example 6, for example, the initiator is still relatively stable after 41 hours with only 6 volume percent ethylene glycol dimethyl ether.

EXAMPLE 7

Several sodium α-methylstyrene polymerization initiators were prepared by the apparatus and technique described in Example 1 with solvent systems which included ethers similar in structure to the ethylene glycol dimethyl ether solvent of the invention. In all of the runs reported in Table IV below, sodium was added in an amount to provide a 0.75 Normal solution. In Control Run C8, the solvent ssytem consisted of 80 volume percent or 322 ml. of benzene and 20 volume percent or 80.5 ml. of tetrahydrofuran. In Control Run C9, the solvent system consisted of 80 volume percent or 322 ml. of benzene and 20 volume percent of a mixture of 30.3 ml. tetrahydrofuran and 50.2 grams of diethylene glycol dimethyl ether (identified as Diglyme in Table IV). In Control Run C10, the solvent system consisted of 79.3 volume percent or 319.1 ml. benzene and 20.7 volume percent or 83.4 grams of tetraethylene glycol dimethyl ether (identified as Tetraglyme in Table IV). In Run No. 7, the solvent system consisted of 80 volume percent or 322 ml. of benzene and 20 volume percent of a mixture of 42.5 ml. tetrahydrofuran and 33.7 grams of ethylene glycol dimethyl ether (identified as EGDME in Table IV); THF in Table IV means tetrahydrofuran. The solutions containing the polymerization initiators were then titrated for normality by the technique described in Example 1 at various intervals of time after preparation. The activity of the initiators at various elapsed times was determined as described in Example 1 and is reported in Table IV below.

TABLE IV

| Run No. | Solvent | Time (hrs.) | Activity (meq./10 g.) | Activity remaining (percent) |
|---|---|---|---|---|
| C8 | 80 benzene, 20 THF | 0.00 | 8.00 | 100 |
| | | 0.58 | 7.49 | 93.6 |
| | | 1.08 | 6.74 | 84.2 |
| | | 2.00 | 6.94 | 86.8 |
| | | 3.50 | 7.62 | 95.2 |
| | | 6.00 | 6.53 | 81.6 |
| | | 23.18 | 2.42 | 30.2 |
| | | 23.62 | 2.49 | 31.1 |
| C9 | 80 benzene, 20 THF and diglyme. | 0.00 | 8.00 | 100 |
| | | 0.48 | 7.53 | 94.1 |
| | | 2.00 | 7.14 | 89.2 |
| | | 20.89 | 1.78 | 22.2 |
| | | 25.57 | 1.09 | 13.6 |
| C10 | 79.3 benzene, 20.7 THF and tetraglyme. | 0.00 | 8.00 | 100 |
| | | 0.57 | 7.38 | 92.2 |
| | | 3.17 | 6.96 | 87.0 |
| | | 7.12 | 5.73 | 71.6 |
| | | 29.32 | 1.60 | 20.0 |
| 7 | 80 benzene, 20 THF and EGDME. | 0.00 | 7.50 | 100 |
| | | 0.40 | 7.67 | 102.2 |
| | | 3.57 | 7.26 | 96.8 |
| | | 19.20 | 5.71 | 76.1 |
| | | 25.40 | 5.38 | 71.1 |
| | | 43.23 | 4.51 | 60.1 |

As indicated by the data obtained in Control Run C8, when 80 volume percent of the tetrahydrofuran solvent is replaced with benzene the activity of the initiator decreases severely in less than 24 hours. When this result is compared to the results obtained in Run No. 7, wherein 33.7 grams of ethylene glycol dimethyl ether is included in the 20 volume percent tetrahydrofuran, the activity of the initiator remains surprisingly high with time even though the solvent system contains 80 volume percent benzene. The results obtained in Control Runs C9 and C10 support the surprising behavior of the ethylene glycol dimethyl ether in the solvent system of the invention. In Control Run C9, the closely related diethylene glycol dimethyl ether not only does not improve the activity of the initiator but actually appears to have a detrimental effect when the results are compared with Control Run C8. In Control Run C10, the tetraethylene glycol dimethyl ether similarly does not improve the activity of the initiator.

EXAMPLE 8

In another run with the apparatus and technique described in Example 1, a 0.5 Normal solution of sodium/α-methylstyrene polymerization initiator was prepared in a solvent system consisting of 80 volume percent or 348 ml. of cyclohexane, 10 volume percent or 44 ml. of tetrahydrofuran, and 10 volume percent of 43 ml. of ethylene glycol dimethyl ether. The solution was titrated by the technique described in Example 1 to determine the normality of the initiator at various intervals of time after preparation. The results of these runs are reported in Table V below.

TABLE V

| Run No. | Time (hrs.) | Activity (meq./10 g.) | Activity remaining (percent) |
|---|---|---|---|
| 8 | 0.00 | 5.60 | 100 |
| | 0.50 | 5.94 | 106.1 |
| | 4.10 | 5.56 | 99.3 |
| | 22.78 | 5.24 | 93.6 |
| | 27.95 | 5.30 | 94.6 |
| | 43.58 | 5.13 | 91.6 |
| | 67.65 | 5.18 | 92.5 |

As indicated by the data reported in Table V, the ethylene glycol dimethyl ether is also effective in stabilizing and hence preserving the activity of the initiator in a solvent system which is predominantly cyclohexane.

Although the invention has been described in considerable detail, such description is for the purpose of illustration only as many variations and modifications are possible by one skilled in the art without departing from the spirit and scope of the invention.

What is claimed is:

1. A method of producing a complex of an organic compound of the formula

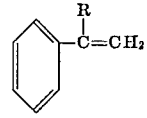

wherein R is phenyl or an alkyl having up to 4 carbon atoms and an alkali metal selected from the group consisting of sodium, potassium, rubidium, and cesium comprising contacting the organic compound and the alkali metal in a proportion of between about 0.5 and about 2 gram atomic weights of alkali metal per gram molecular proportion of organic compound at a temperature of between about 0° and about 50° C. in a solvent system comprising a major amount of hydrocarbon and a minor amount of ethylene glycol dimethyl ether.

2. A method of producing a complex according to Claim 1 wherein said solvent system comprises between about 50 and about 98 volume percent hydrocarbon and between about 2 and about 50 volume percent ethylene glycol dimethyl ether.

3. A method of producing a complex according to Claim 1 wherein said solvent system includes up to 48 volume percent of a cyclic ether selected from the group consisting of tetrahydrofuran and 1,4-dioxane.

4. A method of producing a complex according to Claim 1 wherein said hydrocarbon has between 6 and 12 carbon atoms per molecule and is free of aliphatic unsaturation.

5. A method of producing a complex according to Claim 1 wherein said hydrocarbon is selected from the group consisting of benzene, alkyl benzene, cyclohexane, alkyl cyclohexane, and saturated aliphatic compounds having between 6 and 12 carbon atoms per molecule.

6. A method of producing a complex according to Claim 1 wherein said organic compound is α-methylstyrene.

7. A solution comprising a complex of an organic compound of the formula

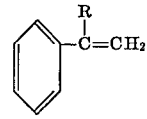

wherein R is phenyl or an alkyl having up to 4 carbon atoms and an alkali metal selected from the group consisting of sodium, potassium, rubidium, and cesium and a solvent system comprising a major amount of hydrocarbon and a minor amount of ethylene glycol dimethyl ether.

8. A solution according to Claim 7 wherein said solvent system comprises between about 50 and about 98 volume percent hydrocarbon and between about 2 and about 50 volume percent ethylene glycol dimethyl ether.

9. A solution according to Claim 7 wherein said organic compound is α-methylstyrene and said complex is sodium α-methylstyrene, the α-methylstyrene being present in said complex as trimers to hexamers.

10. A solution according to Claim 7 wherein said solvent system includes up to 48 volume percent of a cyclic ether selected from the group consisting of tetrahydrofuran and 1,4-dioxane.

11. A solution according to Claim 7 wherein said hydrocarbon has between 6 and 12 carbon atoms per molecule and is free of aliphatic unsaturation.

12. A solution according to Claim 7 wherein said hydrocarbon is selected from the group consisting of benzene, alkyl benzene, cyclohexane, alkyl cyclohexane, and saturated aliphatic compounds having between 6 and 12 carbon atoms per molecule.

References Cited
UNITED STATES PATENTS

| | | | |
|---|---|---|---|
| 2,966,526 | 12/1960 | Hansley | 260—665 R |
| 2,985,594 | 5/1961 | Zimmermann | 260—665 R |
| 3,346,666 | 10/1967 | Dennis | 260—879 |
| 3,452,112 | 6/1969 | Kamienski et al. | 252—431 L |

DANIEL E. WYMAN, Primary Examiner

A. P. DEMERS, Assistant Examiner

U.S. Cl. X.R.

252—431 L; 260—94.2 M, 665 R